United States Patent [19]
Pebley et al.

[11] Patent Number: 6,154,840
[45] Date of Patent: Nov. 28, 2000

[54] SYSTEM AND METHOD FOR TRANSFERRING ENCRYPTED SECTIONS OF DOCUMENTS ACROSS A COMPUTER NETWORK

[75] Inventors: Kevin M. Pebley, Gallatin; Todd D. Carlton, Smyrna, both of Tenn.

[73] Assignee: Northern Telecom Limited, Canada

[21] Appl. No.: 09/071,320

[22] Filed: May 1, 1998

[51] Int. Cl.[7] .................. H04L 9/32; H04L 9/08; G06F 17/30

[52] U.S. Cl. .............. 713/160; 713/150; 380/264; 705/57

[58] Field of Search .................. 380/359, 262, 380/264, 286; 705/57; 713/150, 160, 200

[56] References Cited

U.S. PATENT DOCUMENTS

| | | | |
|---|---|---|---|
| 5,673,316 | 9/1997 | Auerbach et al. | 380/4 |
| 5,835,601 | 11/1998 | Shimbo et al. | 380/49 |
| 5,867,714 | 2/1999 | Todd et al. | 395/712 |
| 5,999,623 | 12/1999 | Bowman et al. | 380/20 |

*Primary Examiner*—Tod R. Swann
*Assistant Examiner*—Justin T. Darrow
*Attorney, Agent, or Firm*—Waddey & Patterson; Mark J. Patterson

[57] ABSTRACT

A system and method for transmitting encrypted documents from a document server to a client computer across network allows a user to select and view fewer than all of the sections of the document so that not all of the encrypted document need be transmitted. An encryption module and encryption key generator allows the document server to generate encryption information for each encrypted section of the secure document and store that information in a key file on the client computer. A decryption module on the client computer accesses the key file to decrypt for viewing the selected document sections transmitted from the server.

23 Claims, 2 Drawing Sheets

SYSTEM AND METHOD FOR TRANSFERRING ENCRYPTED SECTIONS OF DOCUMENTS ACROSS A COMPUTER NETWORK

BACKGROUND OF THE INVENTION

The present invention relates generally to the transfer of encrypted data between computers connected to a network. More specifically, this invention pertains to a system and method for transferring selected sections of an encrypted document stored on a document server across a network to a remote client computer at the request of a user.

Electronic document delivery is rapidly replacing more conventional physical document delivery in many applications. For example, businesses are storing documents of various types and sizes on computers that they control for the purpose of rendering those documents accessible to customers or clients who can connect to that computer or server using the Internet or a proprietary TCP/IP computer network. In such a prior art system, a user would access the document server from the user's remote client computer, locate the document of interest, and send a command that would cause the document to be transferred across the network to the client computer.

In many such applications, the document server computer is connected to a network, such as the Internet, that is accessible to remote computers and users who have no need for the electronic documents stored on the server. If its owner considers the information contained in the electronic documents confidential, then the documents must be secured and protected against unauthorized access. Conventionally, this security is supplied by document encryption. In the various document encryption methods known to those skilled in the art, the secure electronic documents are transferred across the network to a client computer in encrypted form, where they are decrypted using one or more encryption keys made available to authorized users and clients. Most such systems are "avalanche based," meaning that the encryption of each byte of data in an electronic document is dependent on the value of the preceding byte. "Secure Socket Layer" (SSL) is another conventional security protocol in which the electronic documents reside on the server in unencrypted form but are encrypted when transferred across the network to a client.

All such prior art systems and methods for transferring encrypted documents across a network have a common deficiency. If an authorized user requests that a portion of a secure document be transferred from the document server to the client computer, the entire document must be decrypted. If the electronic document is large as compared to the rate at which the encrypted data can be transferred across the network and decrypted, efficiency is compromised. The user must wait to receive the desired section of the document while unwanted sections are also transferred. Valuable user time, processing capacity, and network bandwidth are wasted while an entire electronic document is transferred and decrypted so that the user can access only part of that document.

What is needed, then, is a system and method for transferring a desired section of an encrypted electronic document across a computer network without having to transfer and decrypt the entire document.

SUMMARY OF THE INVENTION

To eliminate the inefficiencies of prior art electronic document delivery systems, the present invention uses a novel "byte-serving" encryption and transfer method. The system of this invention can send a requested portion of a secure document from a document server to a client computer, without having to transfer the entire document, and without compromising security.

One aspect of the present invention provides a system for electronically transferring a secure document across a network to a client computer, the secure document formed of multiple data blocks. The system includes an electronic document server connected to the network, the document server including a server storage device in electronic communication with a processor. An encryption module is connected to the processor so that each data block of the secure document can be stored on the server storage device in encrypted form. The system includes an encryption key generator for generating encryption keys associated with each of the data blocks, using an encryption algorithm. Also, a document manager is associated with the document server and the client computer so that a user of the system can cause the document server to transfer data blocks selected by the user from the secure document to the client computer in encrypted form. A decryption module is associated with the client computer for decrypting the selected data blocks using the encryption keys.

Another aspect of the present invention provides an electronic document server that includes a storage device adapted for electronic storage of a group of data blocks representing a secure document. The document server also has a processor connected to the storage device and an encryption module for encrypting each data block of the secure document such that the data blocks reside on the storage device in encrypted form. An encryption key generator is also provided for generating encryption keys for each encrypted data block on the storage device, using an encryption algorithm. A communications device is responsive to commands from the processor for transmitting in encrypted form selected data blocks of the group of encrypted blocks from the storage device to a user. Consequently, fewer than all of the data blocks in the secure document can be accessed by the user.

Yet another aspect of the invention provides a client computer for accessing a secure document stored on a document server attached to a network. The client computer includes a processor operatively connected to a storage device that is adapted for storing encryption information associated with data blocks of the secure document. The client computer also includes a display device and a communications device connecting the client computer to the network such that data and commands can be sent to and received from the document server. A document manager allows a user of the client computer to view on the display device multiple sections of the secure document, each section corresponding to one or more of the data blocks of the secure document stored in encrypted form on the document server. A means for entering commands allows the user to select for viewing fewer than all of the sections of the secure document. A decryption module is provided for decrypting, using the encryption information, the encrypted data blocks corresponding to the selected sections of the secure document. Thus, the user can view on the display the selected sections of the secure document without viewing the entire document.

An additional aspect of the present invention provides a method of transferring a secure document from a document server to a client computer. The steps of the method include storing the secure document on the server in encrypted form and providing a document manager on the document server for allowing a user to select for viewing on the client computer one or more sections of the secure document. An encryption key is generated for each section of the secure document using an encryption algorithm. The method further provides for transmitting to the client computer in encrypted form only those sections of the secure document selected by the user. Another step of the method provides for decrypting on the client computer the sections of the document selected by the user, using the encryption algorithm.

As is known to those in the art, a computer network server that uses "byte-serving" can transfer random sections or blocks of an electronic file across the network to a client computer. By use of the novel encryption method of this invention, encrypted documents can also be byte-served. Thus, a simple embodiment of the system will have a document server connected to one or more client computers across a TCP/IP network. The document server will include a mass storage device for non-volatile storage of a collection of electronic documents. An encryption module is operatively connected to or integral with the document server so that the electronic documents can be stored in encrypted form. The encryption module includes an encryption key generator that assigns an encryption key K to each of multiple blocks B of data that comprise a single electronic document. Each data block B will preferably have a predetermined number N of data bytes, where the value of N is substantially less than the number of bytes in the entire document. Thus, for an electronic document of one-thousand bytes, there will be 1000/N data blocks, each with its own encryption key, $K_{1 \, to \, 1000/N}$.

When a document comprising D bytes is selected for loading onto the mass storage device in a secure directory, the encryption module reads and separates the document file into D/N blocks $B_{1 \, to \, D/N}$. As each block B is processed in the encryption module, the encryption generator assigns a corresponding encryption key K to that block B, and stores the key in a key file that is linked to that document.

There are any number of encryption algorithms that can be used to encrypt and assign encryption keys K to the data blocks B. In a preferred embodiment, a base key is used, with the length of the base key being a function of the minimum data block size N. The base key is then used by the encryption key generator to create multiple additional sub-keys by rotation of the bits of the base key. Each of the sub-keys can either be stored in the key file for that document or re-generated at the client computer using the same algorithm. As the document file is read in blocks, the encryption module selects or re-generates one of sub-keys to associate with each block B using an algorithm that is based in part on the value of the data in the block. In accordance with one aspect of this invention, the encryption key associated with one block of data is not dependent on the value or encryption of the preceding block of data in the document.

Preferably, the key file containing the document encryption key(s) K is delivered to an authorized user for storage on the client computer. The client computer further includes a decryption module that accesses the key file that is stored when a portion of the document linked to that key file is transferred to the client computer from the document server. Using the same algorithm used by the encryption module to select the sub-key to associate with a specific data block, the decryption module decrypts the data block by accessing the proper sub-key in the key file or by re-generating the keys using the encryption algorithm.

DESCRIPTION OF THE PREFERRED EMBODIMENTS

Figure 1:
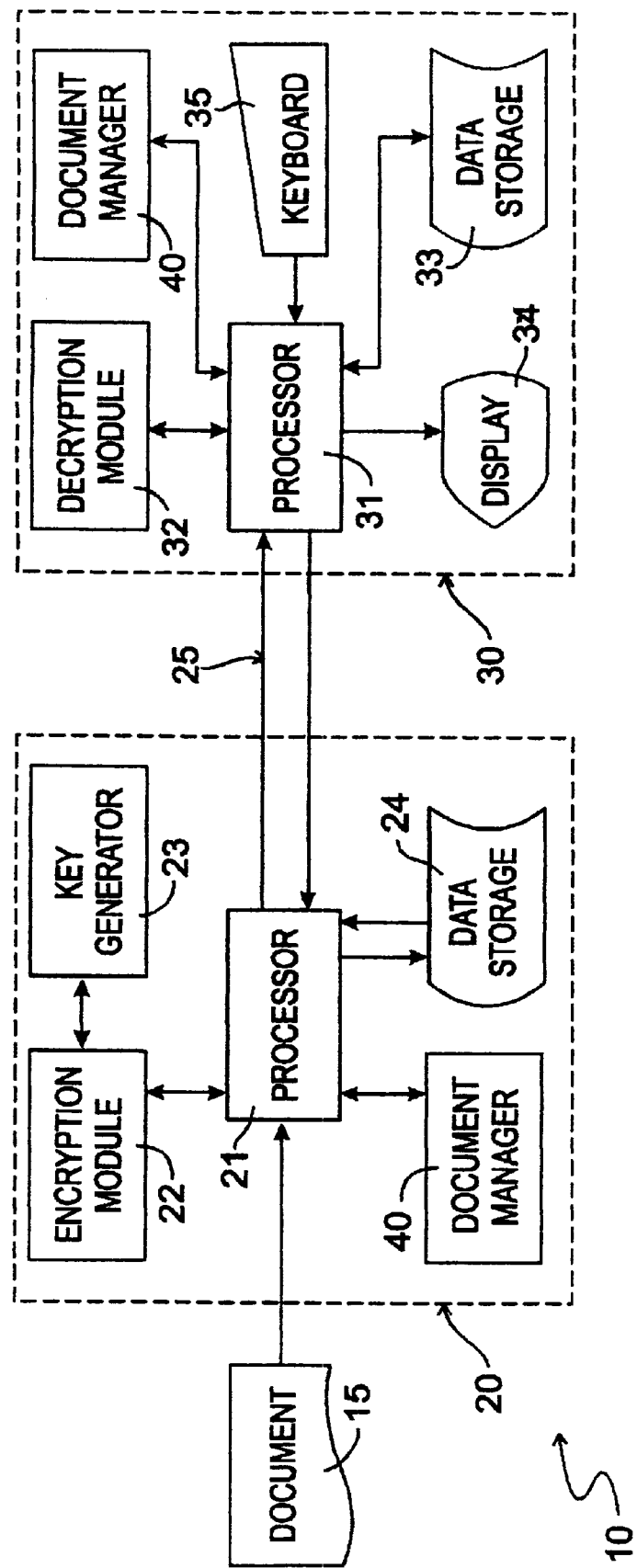
FIG. 1 is block diagram of an embodiment of the system of the present invention.
Figure 2:
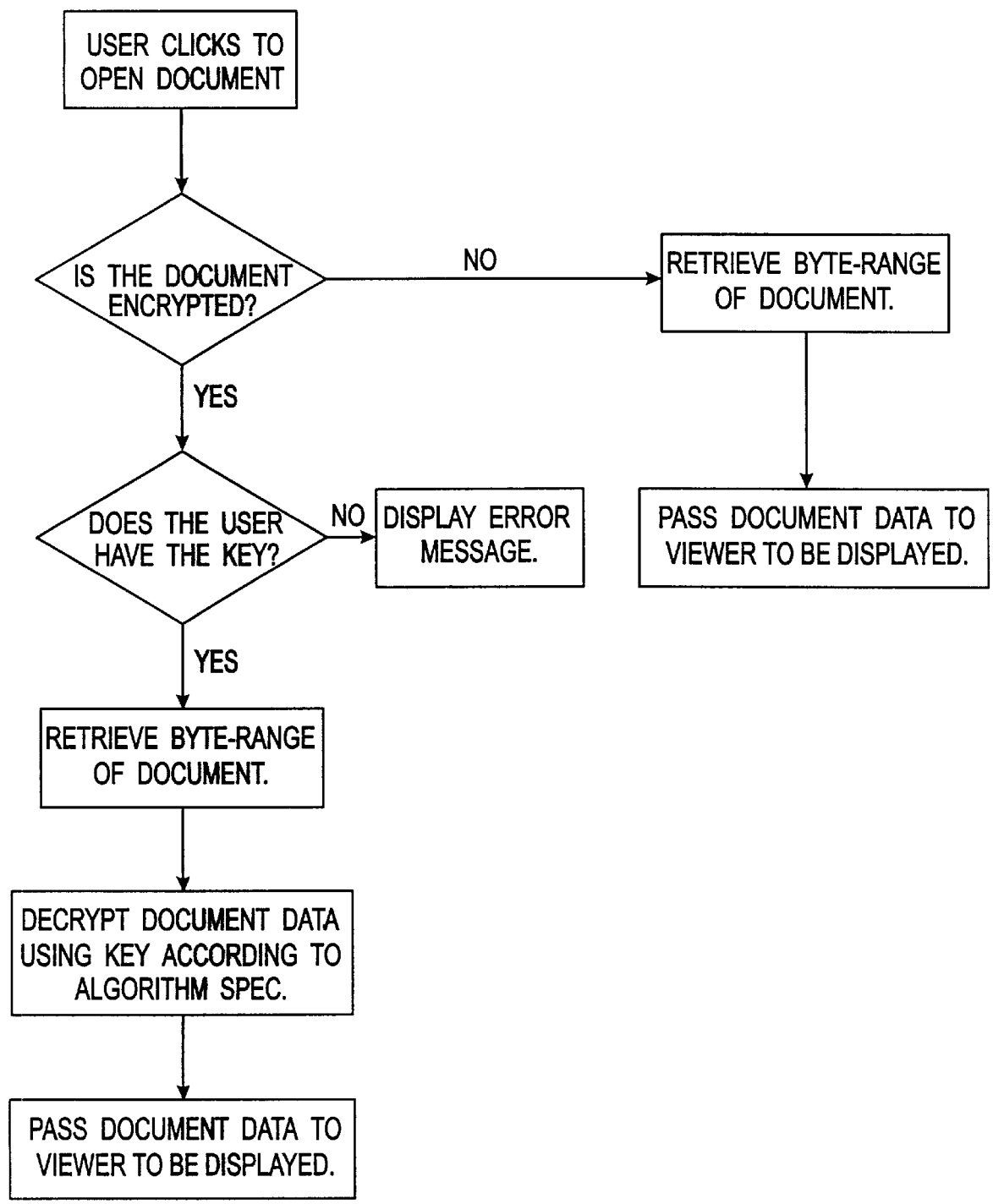
FIG. 2 is a flow chart showing the basic steps of the method of this invention when access is sought from a client computer to a secure document stored on a document server.

One embodiment of system 10 of this invention is shown in FIG. 1. An electronic document server 20 is conventionally connected to a client computer 30 over a conventional network connection 25. The nature of network connection 25 is not critical and can be any one of a variety of network types known to those skilled in the art. For example, in a preferred embodiment, document server 20 and client computer 30 will be connected to the Internet or wide area network using a TCP/IP protocol. Accordingly, although only one document server 20 and client computer 30 are shown for simplicity, such a network can include multiple document servers 20 as well as multiple client computers 30, each of which are interconnected via a common network.

A first function of electronic document server 20 is to receive and store electronic copies of one or more documents 15 on a mass data storage device 24. Document 15 can be loaded onto the document server 20 using any conventional means, including keyboard typing, scanning, or direct electronic delivery. Data storage device 24 can be any non-volatile storage apparatus, such as a disc drive or tape drive, controlled by and in communication with processor 21. Processor 21 of the document server 20 is also conventional, being part of an industry standard personal computer or workstation and under the control of a conventional multi-user operating system, such as UNIX or Windows NT.

Document server 20 must be capable of functioning in a "byte serving" mode whereby blocks of data that form single document 15 can be accessed and transferred across the network without having to transfer entire document 15.

Document server 20 will be connected to the network through a conventional network interface card or modem (not shown), such that document server 20 can send and receive data across the network as well as receive and respond to commands from client computer 30 controlled by users who are authorized to access document server 20.

Each client computer 30 will also include processor 31 associated with a conventional personal computer. Processor 31 will be operatively linked in conventional manner to keyboard 35, display 34, and non-volatile data storage device 33, such as a disc drive or tape drive.

In accordance with the objectives of this invention, a second function of the document server 20 is to provide secure storage and access to certain of documents 15 which may contain confidential information accessible only be authorized users. Accordingly, document server 20 will further include an encryption module 22 so that one or more documents 15 can reside on data storage device 24 in a secure or encrypted form. An encryption key generator 23 is operatively associated with the encryption module 22 so that an encryption key can be generated and associated with each block of encrypted data forming a secure document 15. The encryption key generator works in conjunction with the encryption module 22 and processor 21 so that when a document 15 is selected for secure storage, a key is generated for each data block in that document 15. The keys associated with each data block can either be stored in a key file on the storage device 24 or re-generated during decryption using the same algorithm. The encryption algorithm and keys are such that encryption of one data block in a secure document is not dependent on encryption of a preceding block.

Similarly, a decryption module 32 is operably connected to processor 31 of client computer 30. As will be described in more detail below, the decryption module 32 decrypts the encrypted blocks of data transmitted across the network from document server 20 to client computer 30, when requested to do so by an authorized user of the system 10.

System 10 will preferably include a document manager 40 that provides a user-friendly interface at the client computer 30 while presenting several document management options to the user. The document manager 40 will typically be implemented in software having both client and server modules so that document server 20 can respond to commands entered by the user at client computer 30. When the user and client computer 30 connects to document server 20 across the network, the document manager 40 will display a list of accessible documents that reside on storage device 24. The document list displayed to the user will include information that identifies secure documents 15 that are encrypted as well as notifying the user if the key needed to decrypt document 15 is available on client computer 30. If the key is not present, then an error message is generated to the user. If the user has authority to access the document, the document manager 40 can give the user the option to transfer the encryption information or key file from server 20 to client 30.

If the key is available the user can the n review an index of document 15, with the index entries representing sections of the document that correspond to the various data blocks that form document 15. The user then selects the section(s) (lock or "byte range") of document 15 that the user wishes to see. This request is transmitted to server 20.

With certain document formats, a true "index" is not needed. For example, if a document is stored in PDF format, a page being requested corresponds to a specific byte-range, and the user simply pages from page to page, or elects to "go to page". In SGML format documents, "pages" do not exist and the user will be scrolling through document blocks or fragments. System 10 maps the user requests to a byte-range as the scrolling takes place, with no special input from the user.

The server portion of the document manager 40 retrieves the selected block or blocks from storage device 24 an d transmits them in encrypted form across network connection 25 to client computer 30. When client computer 30 receives the block, decryption module 32 is activated, and the encryption information is used to decrypt the block so that the user can view the selected document section on display 34.

Encryption module 22 and decryption module 32 must use the same keys and therefore must be under the control of the same encryption algorithm. There are any number of algorithms that can be used, as long as they are compatible with byte—serving client—server data encryption and transfer. One aspect of the novel method of this invention is that the encryption algorithm operates so that the encryption of a block of data from a document is not dependent on the value or encryption of a preceding block of data. One example of such an algorithm is described below.

This example encryption algorithm uses a base key and multiple sub-keys. The length of the base key K0 is selected to correspond to the minimum size of a data block B. Thus, for a block B of 5 bytes, the base key K0 will be 40 bits (KEY-LENGTH=5 bytes). As implemented in encryption module 22 and key generator 23, this example encryption algorithm proceeds as follows, using a sample base key K0:

Step 1:

| | |
|---|---|
| From a 40-bit key, K0, 7 sub-keys are generated (K1–K7) as follows: | 1111111100000000110110110010010010101010 |
| K0>> rotate left 1 bits >>K1 | 1111111000000001101101100100100101010101 |
| K1>> rotate left 2 bits >>K2 | 1111100000000110110110010010010101010111 |
| K2>> rotate left 3 bits >>K3 | 1100000000110110110010010010101010111111 |
| K3>> rotate left 4 bits >>K4 | 0000001101101100100100101010101111111100 |
| K4>> rotate left 5 bits >>K5 | 0110110110010010010101010111111110000000 |
| K5>> rotate left 6 bits >>K6 | 0110010010010101010111111110000000011011 |
| K6>> rotate left 7 bits >>K7 | 0100101010101111111100000000110110110010 |

Step 2:

| | |
|---|---|
| For a given data block B of 5-bytes, the document file is read on a 5 byte boundary. The sub-key used to encrypt the given block B is determined as follows: | Start byte = 1026 |
| (((start byte-1)/KEY_LENGTH) mod 8) = Y | (1025 − 1)/5 mode 8 = 5 |
| where Y is the sub-key number, 0–7, used to encrypt this block of data | K5 is used for this block |

Step 3:

| | |
|---|---|
| The block B is exclusive p37 OR'ed with the proper key | 1010111011010111001100110101010101001010 <br> 0110110110010010010101010111111110000000 <br> 1100001101000101011001000010101011001010 |

Step 4:

| | |
|---|---|
| Determine the confusion factor: | |
| If the start byte position in the file is odd, R = rotate right, else R = Rotate left | Rotate left, because start byte = 1026 |
| Z is the block number determined by start byte div KEY_LENGTH = Z | 1026 div 5 = 205 |

-continued

| | |
|---|---|
| Z mod (KEY_LENGTH*4) = S where S is rotate value. | 205 mod (5 * 4) = 5 |
| Rotate chunk Z, in direction R by S bits. | 0110100010101100100001010101100101011000 |

If secure document 15 is in a PDF graphic format, the document files will preferably have P bytes added to the beginning of the file, where P is given by $$P = \text{KEY\_LENGTH} - (\text{FileSize mod KEY\_LENGTH})$$

This step is taken to help confuse a potential attack on system 10. Otherwise, the first five (5) characters of the PDF document file would be:

% PDF1 and an unauthorized user could take advantage of this to try to discover the key through brute force techniques frequently used by computer system hackers.

Encryption module 22, encryption key generator 23, and decryption module 32 can be implemented in various combinations of hardware, firmware, and software. Preferably, they will reside in software stored on document server 20 and client computer 30 and be compatible with the operating systems associated with processors 21 and 31.

System 10 can be adapted for use with many different document formats, including PDF and SGML. As used herein, a "document" is any body of data that exists in one cohesive form or that can be built dynamically from instructions found in the original cohesive form or from subsequent instructions from dynamically loaded forms.

Also, although system 10 has been described in terms of a client-server computer network, it can also be used to improve the efficiency of transfer of encrypted documents from a storage device, such as a CD-ROM drive, for viewing on a stand-alone computer to which that device is attached, without going across a network connection.

Although the present invention has been described in detail, it should be understood that various changes, substitutions and alterations can be made hereto without departing from the spirit and scope of the invention as defined by the appended claims.

What is claimed is:

1. A system for electronically transferring a secure document across a network to a client computer, the secure document formed of a plurality of data blocks, comprising:
   a. an electronic document server connected to the network, the document server including a server storage device in electronic communication with a processor;
   b. an encryption module operatively connected to the processor whereby each data block of the secure document can be stored on the server storage device in encrypted form;
   c. an encryption key generator for generating encryption keys associated with each of the data blocks, using an encryption algorithm;
   d. a document manager operatively associated with the document server and the client computer such that a user of the system can cause the document server to transfer data blocks selected by the user from the secure document to the client computer in encrypted form, the data blocks selected by the user for transfer to the client computer comprising only a section of the secure document; and
   e. a decryption module operatively connected to the client computer for decrypting the selected data blocks using the encryption keys.

2. The system of claim 1 further comprising a client storage device connected to the client computer, the client storage device storing the encryption algorithm separately from the selected data blocks whereby the encryption keys can be re-generated by the decryption module.

3. The system of claim 1 further comprising a client storage device connected to the client computer, the client storage device storing the encryption keys in a key file separate from the selected data blocks.

4. The system of claim 1 wherein the network is accessible through an Internet connection.

5. The system of claim 1 wherein the encryption algorithm can encrypt the secure document such that the encryption of any one of the data blocks in the secure document is not dependent on encryption of another of the data blocks in the secure document.

6. The system of claim 5 wherein the encryption keys include a base key associated with each secure document and a plurality of sub-keys associated with the data blocks in the secure document.

7. The system of claim 6 wherein the base key has a key length that is a function of a minimum size of the data blocks in the secure document and each of the sub-keys is determined in part on data forming part of the data block associated with the encryption key.

8. An electronic document server comprising:
   a. a storage device adapted for electronic storage of a group of data blocks representing a secure document;
   b. a processor operatively connected to the storage device;
   c. an encryption module for encrypting each data block of the secure document such that each of the data blocks reside on the storage device in encrypted form;
   d. an encryption key generator for generating encryption keys for each encrypted data block on the storage device, using an encryption algorithm; and
   e. a communications device responsive to commands from the processor for transmitting in encrypted form selected data blocks of the group of encrypted blocks from the storage device to a user whereby fewer than all of the encrypted data blocks in the secure document are transmitted to and accessed by the user.

9. The document server of claim 8 wherein the encryption algorithm encrypts the secure document such that the encryption of any one of the data blocks in the document is not dependent on encryption of another of the data blocks in the secure document.

10. The document server of claim 9 wherein the encryption keys include a base key associated with each document and a plurality of sub-keys associated with the data blocks in the document.

11. The document server of claim 8 further comprising a document manager operatively connected to the processor and adapted for displaying a list of secure documents accessible on the document server.

12. The document server of claim 11 wherein the document manager includes means to allow the user to scroll through encrypted sections of the secure document such that the processor automatically sends the encrypted sections to the communications device in response to requests generated as the user scrolls through the encryption sections.

13. The document server of claim 11 wherein the communications device is a network interface card.

14. A client computer for accessing a secure document stored on a document server attached to a network comprising:

a. a processor operatively connected to a storage device, the storage device adapted for storing encryption information associated with data blocks of the secure document;

b. a display device;

c. a communications device connecting the client computer to the network such that data and commands can be sent to and received from the document server;

d. a document manager for allowing a user of the client computer to view on the display device multiple encrypted sections of the secure document, each encrypted section corresponding to one or more of the data blocks of the secure document stored in encrypted form on the document server;

e. command entry means for allowing the user to select for viewing and transmitting across the network fewer than all of the encrypted sections of the secure document; and f. a decryption module for decrypting, using the encryption information, the encrypted data blocks corresponding to the selected encrypted sections of the secure document whereby the user can view on the display the selected encrypted sections of the secure document without viewing the entire secure document.

15. The client computer of claim 14 wherein the encryption information comprises encryption keys associated with each data block.

16. The client computer of claim 14 wherein the encryption information comprises an encryption algorithm whereby encryption keys associated with each data block can be re-generated on the client computer during decryption of the secure document.

17. The client computer of claim 16 wherein the encryption algorithm encrypts the secure document such that the encryption of any one of the data blocks in the secure document is not dependent on encryption of another of the data blocks in the secure document.

18. A method of transferring a secure document from a document server to a client computer comprising the steps of:

a. storing the secure document on the document server in encrypted form;

b. providing a document manager on the document server for allowing a user to select for viewing on the client computer one or more encrypted sections of the secure document;

c. generating an encryption key for each encrypted section of the secure document using an encryption algorithm;

d. transmitting to the client computer, in encrypted form, only those encrypted sections of the secure document selected by the user; and e. decrypting on the client computer the encrypted sections of the secure document selected by the user, using the encryption algorithm.

19. The method of claim 18 further comprising the step of transferring to the client computer an encryption key file containing encryption information associated with each encrypted section of the secure document, whereby the encryption key file is separate from the encrypted sections of the document.

20. The method of claim 19 wherein the encryption algorithm encrypts the secure document such that the encryption of any one of the encrypted sections in the document is not dependent on encryption of another of the encrypted sections in the secure document.

21. The method of claim 20 further comprising generating a base encryption key associated with each document and a plurality of sub-keys associated with each of the encrypted sections of the document whereby the encryption keys include the base key and the sub-keys.

22. The method of claim 20 wherein the encryption information comprises the encryption keys.

23. The method of claim 20 wherein the encryption information comprises the encryption algorithm and wherein the method further comprises the step of re-generating the encryption keys on the client computer during decryption of the encrypted sections of the secure document.

* * * * *